(12) United States Patent
Lee et al.

(10) Patent No.: US 11,852,944 B2
(45) Date of Patent: Dec. 26, 2023

(54) ELECTROCHROMIC MODULE, CAMERA MODULE, AND ELECTRONIC DEVICE

(71) Applicant: TRIPLE WIN TECHNOLOGY(SHENZHEN) CO.LTD., Shenzhen (CN)

(72) Inventors: Ming-Hsun Lee, New Taipei (TW); Yen-Lin Peng, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 182 days.

(21) Appl. No.: 17/375,317

(22) Filed: Jul. 14, 2021

(65) Prior Publication Data
US 2022/0019116 A1    Jan. 20, 2022

(30) Foreign Application Priority Data

Jul. 15, 2020 (CN) .......................... 202010682513.0

(51) Int. Cl.
| | |
|---|---|
| *G02F 1/157* | (2006.01) |
| *G02F 1/155* | (2006.01) |
| *G02F 1/1333* | (2006.01) |
| *G03B 30/00* | (2021.01) |

(52) U.S. Cl.
CPC ........ *G02F 1/157* (2013.01); *G02F 1/133308* (2013.01); *G02F 1/155* (2013.01); *G03B 30/00* (2021.01); *G02F 2202/28* (2013.01)

(58) Field of Classification Search
CPC ...... G02F 1/157; G02F 1/155; G02F 2202/28; G03B 11/00
See application file for complete search history.

(56) References Cited

U.S. PATENT DOCUMENTS

| | | | | |
|---|---|---|---|---|
| 2008/0124072 A1* | 5/2008 | Yuan | ........................ | G03B 9/08 |
| | | | | 396/457 |
| 2014/0224966 A1* | 8/2014 | Chung | ..................... | G02B 5/00 |
| | | | | 250/208.4 |

(Continued)

FOREIGN PATENT DOCUMENTS

| | | |
|---|---|---|
| CN | 106154672 A | 11/2016 |
| CN | 208489883 U | 2/2019 |

(Continued)

*Primary Examiner* — Michael H Caley
*Assistant Examiner* — Agnes Dobrowolski
(74) *Attorney, Agent, or Firm* — ScienBiziP, P.C.

(57) ABSTRACT

An electrochromic module includes two opposite positioned first substrates and at least one electrochromic unit disposed between the first substrates. Each of the electrochromic unit includes a first conductive layer, a filter layer, and a second conductive layer stacked in turn. One end of the first conductive layer protrudes from an edge of the filter layer to form a first electrode area. One end of the second conductive layer protrudes from another edge of the filter layer to form a second electrode area. Vertical projections of the first electrode area and the second electrode area on the first substrates are spaced apart from each other. Each of the first electrode area and the second electrode area is configured to connect to a power supply. The electrochromic module can make it easy to connect the electrochromic unit to the power supply.

9 Claims, 16 Drawing Sheets

(56) References Cited

U.S. PATENT DOCUMENTS

| | | | | |
|---|---|---|---|---|
| 2014/0268284 A1* | 9/2014 | Naijo | ............... | G02F 1/153 |
| | | | | 359/270 |
| 2016/0011481 A1* | 1/2016 | Bergh | ............... | G02F 1/155 |
| | | | | 359/275 |
| 2020/0003870 A1* | 1/2020 | Chen | ............... | G01S 17/10 |

FOREIGN PATENT DOCUMENTS

| | | |
|---|---|---|
| CN | 210573117 U | 5/2020 |
| JP | H06-258691 A | 9/1994 |
| JP | 2007-292997 A | 11/2007 |
| TW | 201432643 A | 8/2014 |
| TW | 201640205 A | 11/2016 |

\* cited by examiner

ELECTROCHROMIC MODULE, CAMERA MODULE, AND ELECTRONIC DEVICE

FIELD

The subject matter herein generally relates to camera technology, especially to an electrochromic module, a camera module with the electrochromic module, and an electronic device with the camera module.

BACKGROUND

Cameras include images that may sense light with a full wavelength, including visible light, infrared light, and ultraviolet light, and form an image. Human eyes can only see the visible light, so a great difference may exist between the image captured by the camera and an image formed in the human eyes.

In order to improve a visual effect of the camera, a filter will be added in the camera. The filter is to block the infrared light and the ultraviolet light from entering the image sensor, so that the image sensor can only sense the visible light. However, different wavelengths of light will interfere with each other during a filtering process. Furthermore, the filter has a large volume, which increases the size of the camera.

BRIEF DESCRIPTION OF THE DRAWINGS

Implementations of the present disclosure will now be described, by way of embodiment, with reference to the attached figures.

DETAILED DESCRIPTION

Figure 1:
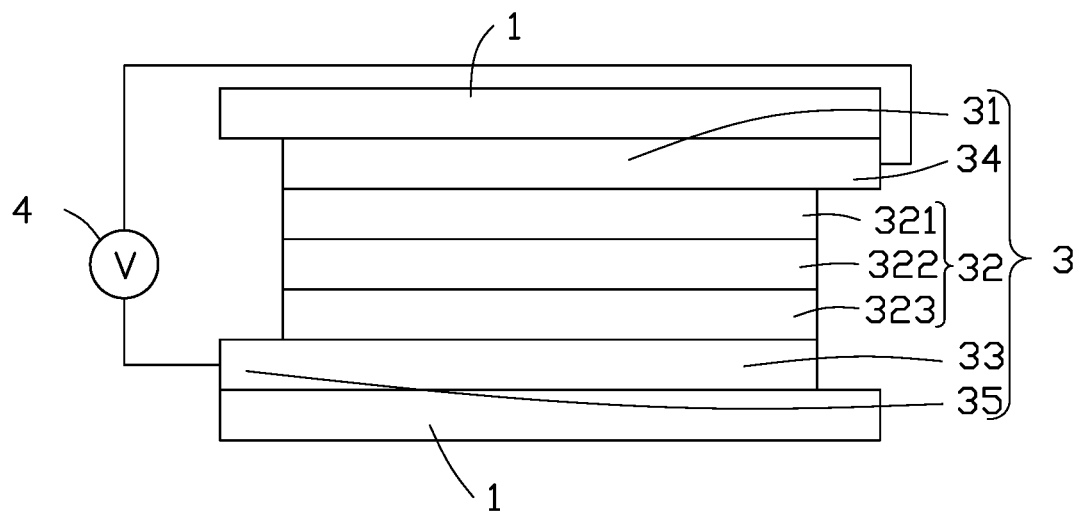
FIG. 1 is a diagrammatic view of an electrochromic module according to an embodiment of the present disclosure.

Implementations of the disclosure will now be described, by way of embodiments only, with reference to the drawings. It should be noted that the embodiments and the features of the present disclosure can be combined without conflict. Specific details are set forth in the following description to make the present disclosure to be fully understood. The embodiments are only portions of, but not all the embodiments of the present disclosure. Based on the embodiments of the present disclosure, other embodiments obtained by a person of ordinary skill in the art without creative efforts shall be within the scope of the present disclosure.

Unless defined otherwise, all technical and scientific terms used herein have the same meaning as commonly understood by one of ordinary skill in the art. The terms used herein in the specification of the present disclosure are only for describing the embodiments and are not intended to limit the present disclosure. The term "and/or" as used herein includes any combination of one or more related items.

FIGS. 1-7 illustrate an embodiment of an electrochromic module 100. The electrochromic module 100 includes two opposite positioned first substrates 1, and at least one electrochromic unit 3 between two first substrates 1. Each of the electrochromic unit 3 includes a first conductive layer 31, a filter layer 32, and a second conductive layer 33 stacked in that turn. One end of the first conductive layer 31 protrudes from an edge of the filter layer 32 to form a first electrode area 34. One end of the second conductive layer 33 protrudes from another edge of the filter layer 32 to form a second electrode area 35. Vertical projections of the first electrode area 34 and the second electrode area 35 on the first substrates 1 do not overlap. Each of the first electrode area 34 and the second electrode area 35 is respectively configured to connect a positive electrode and a negative electrode of the power supply 4.

In one embodiment, the first substrate 1 is transparent glass-plate. The first conductive layer 31 and the second conductive layer 33 are positioned on two opposite surfaces of the first substrate 1. The first conductive layer 31 and the second conductive layer 33 are transparent conductive adhesive.

In one embodiment, the filter layer 32 includes an electrochromic layer 321, an electrolyte layer 322, and an ion storage layer 323. The electrochromic layer 321, the electrolyte layer 322, and the ion storage layer 323 are stacked in that turn. The electrochromic module 100 is capable of varying its light transmission in response to the application of an electric field. A possibility of multicolor can be matched by setting different electrolyte layers 322. The color change of the filter layer 32 can be realized by reversible reaction of a single color, or by applying different voltages to the same filter layer 32 to electrochromic different colors, so as to realize an adjustable change of different colors.

In one embodiment, the first conductive layer 31 and the second conductive layer 33 are ITO transparent conductive layer.

The electrochromic unit 3 can vary its light colors by producing electrochromic reaction under the electric field. How to connect the first electrode area 34 and the second electrode area 35 to the power supply 4 respectively has become an important research of the electrochromic module 100. Two first substrates 1 has at least one central region and at least one peripheral region that extends outwardly from the central region. The first conductive layer 31 and one substrates 1 form a first ITO conductive layer, and the second conductive layer 33 and another first substrates 1 form a second ITO conductive layer. The first conductive layer 31 is positioned on the central region of the first substrates 1. One edge of the first conductive layer 31 extends outwardly from the central region to the peripheral region of the first substrates 1 to form the first electrode area 34. The second conductive layer 33 is positioned on the central region of the other first substrates 1. One edge of the second conductive layer 33 extends outwardly from the central region to the peripheral region of the other first substrates 1 to form the second electrode area 35. The first electrode area 34 and the second electrode area 35 are positioned staggered from different directions, so as to connect to the power supply 4 easily.

Figure 2:
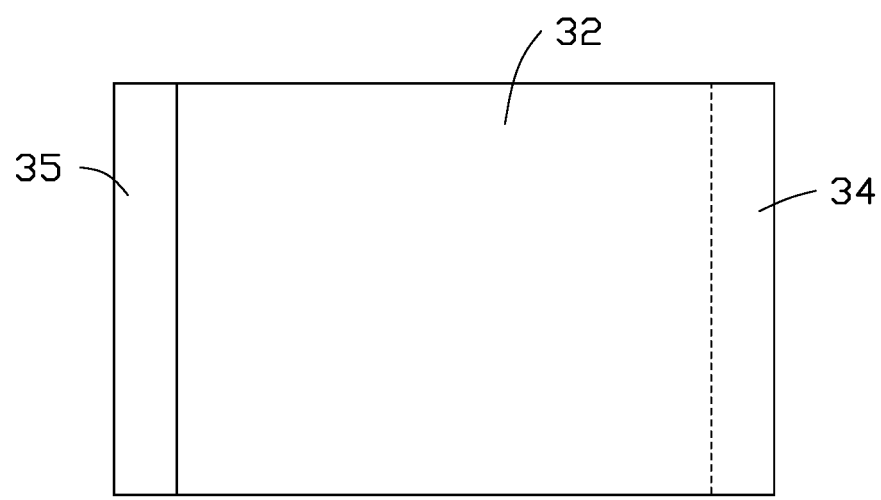
FIG. 2 is a vertical view of the electrochromic module in FIG. 1.

In one embodiment, referring to FIG. 2, the first electrode area 34 and the second electrode area 35 are positioned on opposite sides of the filter layer 32. For example, a left edge of the first conductive layer 31 extends outwardly from the central region to the peripheral region of the first substrates 1 to form the first electrode area 34. A right edge of the second conductive layer 33 extends outwardly from the central region to the peripheral region of the other first substrates 1 to form the second electrode area 35. The filter layer 32 is sandwiched between the first conductive layer 31 and the second conductive layer 33. The filter layer 32 is corresponding the central region of the first substrates 1.

Figure 3:
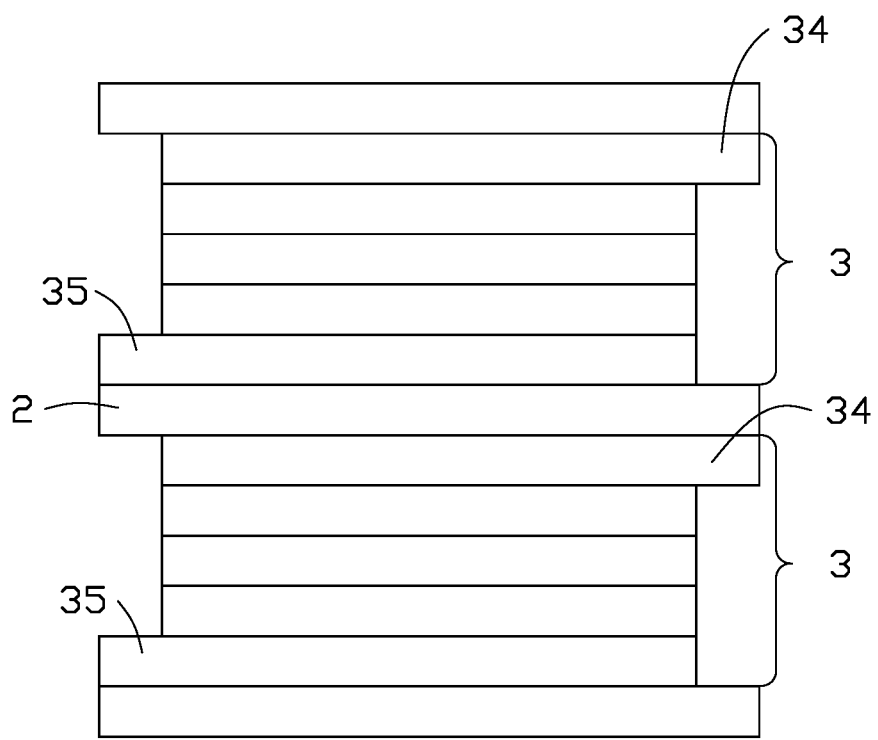
FIG. 3 is a diagrammatic view of an electrochromic module according to another embodiment of the present disclosure.
Figure 4:
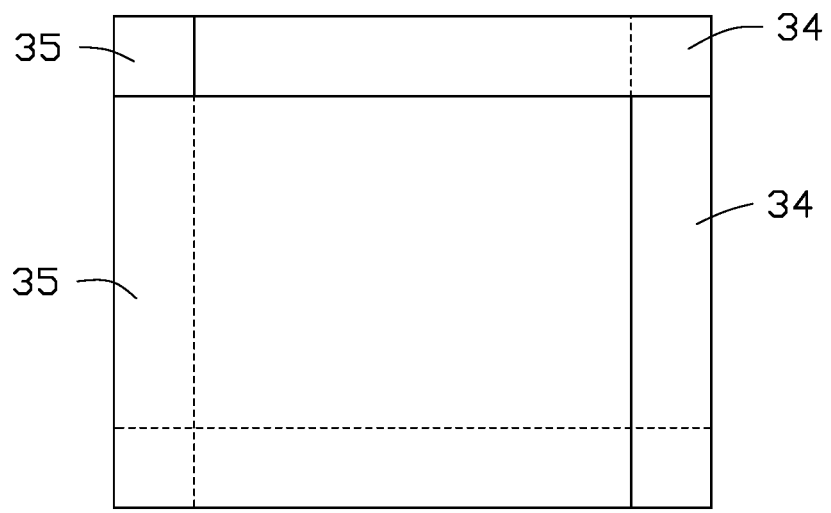
FIG. 4 is a vertical view of the electrochromic module in FIG. 3.

In another embodiment, referring to FIGS. 3-4, a plurality of electrochromic units 3 is sandwiched between two first substrates 1. The plurality of electrochromic units 3 are stacked along a direction perpendicular to each of the first substrates 1. A second substrate 2 is sandwiched between the two first substrates 1. The second substrate 2 is between two adjacent of the plurality of electrochromic units 3. The vertical projections of the first electrode area 34 and the second electrode area 35 of each of the plurality of electrochromic units 3 on the first substrate 1 are spaced apart from each other. Any two of the vertical projections do not overlap with each other. The first electrode area 34 and the second electrode area 35 are positioned staggered from different directions, so as to connect to different power supplies 4 by multiple independent conductive layers easily. The multiple conductive layers do not overlap with each other. Multiple groups of the electrochromic units 3 are arranged in the way of lamination to form a stack structure, so that lights of multiple wavelengths can be adjusted. The stack structure of the electrochromic units 3 make a range of wavelengths of lights can be modulated, and the light modulation can be more flexible. In one embodiment, in the electrochromic module 100, there is at least one electrochromic unit 3 on a same layer, and at least two electrochromic units 3 on a same column. In one embodiment, in the electrochromic module 100, there is one electrochromic unit 3 on a same layer, and two electrochromic units 3 on a same column. In this embodiment, two wavelengths of lights can be modulated by the electrochromic module 100.

Figure 5:
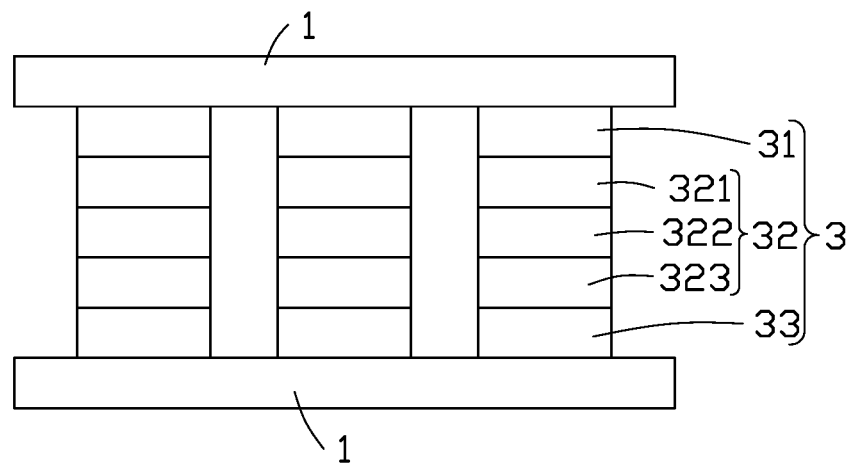
FIG. 5 is a diagrammatic view of an electrochromic module according to a third embodiment of the present disclosure.
Figure 6:
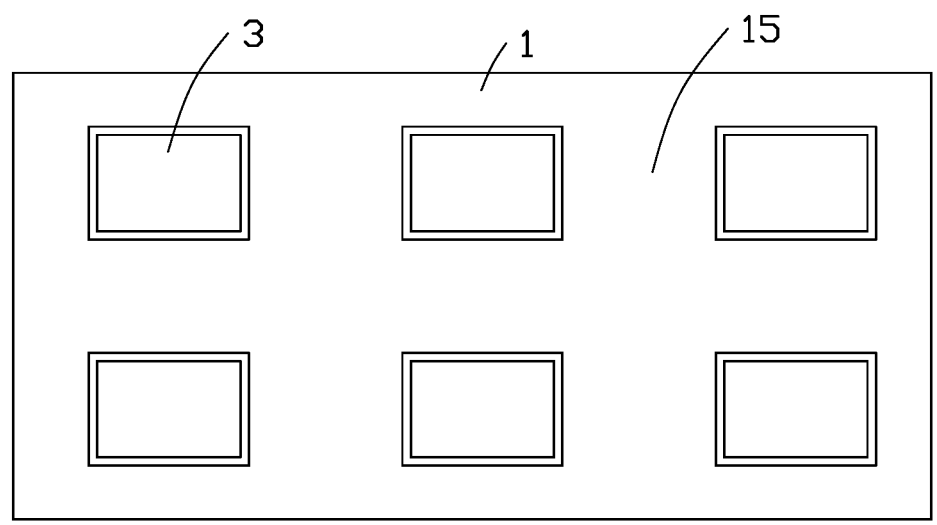
FIG. 6 is a vertical view of the electrochromic module in FIG. 5.
Figure 7:
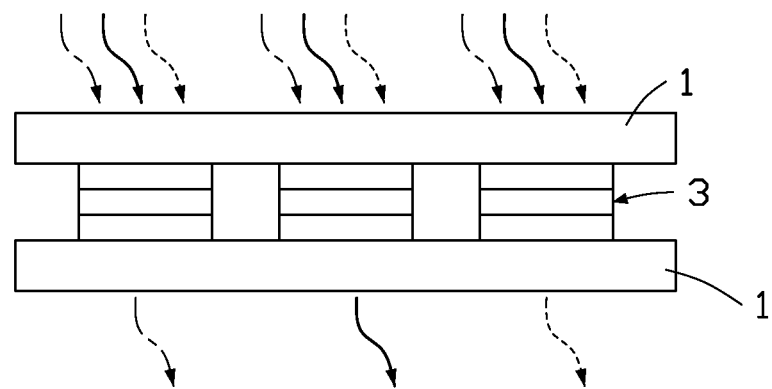
FIG. 7 is a filtering process of the electrochromic module in FIG. 5.

In a third embodiment, referring to FIGS. 5-7, a plurality of electrochromic units 3 is sandwiched between two first substrates 1. The plurality of electrochromic units 3 are arranged on a plane of each of the first substrates 1. A gap 15 is formed between two adjacent of the plurality of electrochromic units 3. Each of the plurality of electrochromic units 3 is configured to connect to a power supply 4. The gaps 15 are easy to lead out the first electrode area 34 and the second electrode area 35 from the mounting bracket 5 to connect to the power supplies 4. The first electrode area 34 and the second electrode area 35 on different electrochromic units 3 are respectively connected to the positive and negative electrodes of different power supplies 4. The plurality of electrochromic units 3 have different electrolyte. Multiple of the electrochromic units 3 are provided different voltages through different power supplies 4, so that different electrochromic units 3 can be accurately controlled by independent power supplies 4. In this way, in a plane, not only one kind of wavelength can be modulated, but also more kinds of wavelengths can be modulated to design a multi-color electrochromic module 100.

Figure 8:
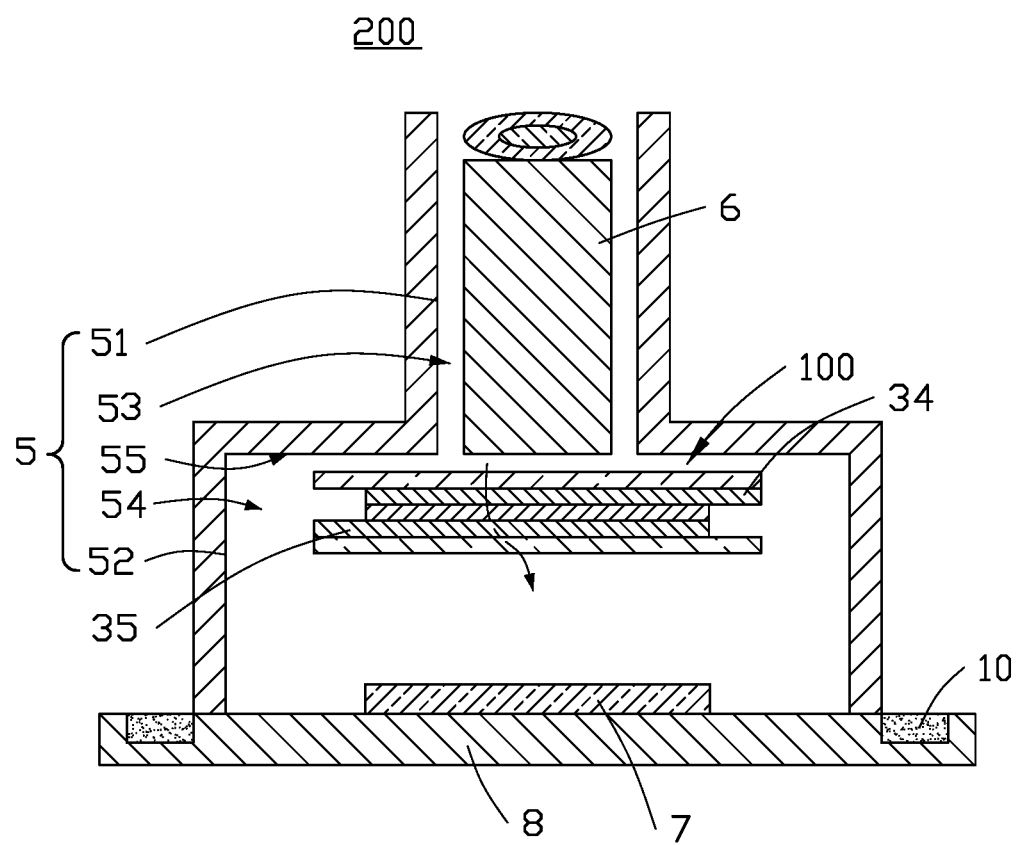
FIG. 8 is a diagrammatic view of a camera module according to an embodiment of the present disclosure.

FIG. 8 illustrate an embodiment of a camera module 200. The camera module 200 includes a circuit board 8, a mounting bracket 5 disposed on the circuit board 8, a lens unit 6 disposed on the mounting bracket 5, an image sensor 7 disposed on the circuit board 8 and received in the mounting bracket 5, and the electrochromic module 100 received in the mounting bracket 5. The electrochromic module 100 is located between the lens unit 6 and the image sensor 7. The first electrode areas 34 and the second electrode areas 35 of the electrochromic module 100 are connect to the circuit board 8, respectively.

Referring to FIG. 8, the mounting bracket 5 includes a plurality of first sidewalls 51 and a plurality of second sidewalls 52 connected to the first sidewalls 51. The first sidewalls 51 cooperatively defines a first cavity 53. The second sidewall 52 cooperatively defines a second cavity 54. An internal dimension of the second cavity 54 is greater than an internal dimension of the first cavity 53. A fixing surface 55 is formed between the plurality of first sidewalls 51 and the second sidewalls 52. The lens unit 6 is disposed in the first cavity 53. One end of the plurality of second sidewall 52 away from the plurality of first sidewalls 51 is disposed on the circuit board 8. The electrochromic module 100 is disposed on the fixing surface 55 and received in the second cavity 54. The electrochromic module 100 is convenient to install in the mounting bracket 5, and at the same time, the first electrode areas 34 and the second electrode areas 35 are convenient to lead out from the mounting bracket 5 to connect to the circuit board 8. Different wavelengths of lights entering the image sensor 7 are controlled by applying different voltages to the electrochromic module 100. A light with required wavelength can be adjusted independently to enter the image sensor 7, so as to avoid mutual interference caused by different lights with different wavelengths entering the image sensor 7 at the same time.

Two ways to lead the first electrode areas 34 and the second electrode areas 35 of the electrochromic module 100 out from the mounting bracket 5 to connect to the circuit board 8 are provided.

Referring to FIGS. 9-14, the first electrode areas 34 and the second electrode areas 35 of the electrochromic module 100 are led out from the mounting bracket 5 to connect to the circuit board 8 by a conductive layer 9. The conductive layer 9 is conductive adhesive. The conductive layer 9 is formed on the surface of the mounting bracket 5 by laser direct structuring (LDS). The first electrode area 34 and the second electrode area 35 in each electrochromic unit 3 are through two conductive layers 9 on the surface of the mounting bracket 5 leading out to connect to the circuit board 8, respectively. One end of the conductive layer 9 is fixed on the first electrode area 34 or the second electrode area 35 by conductive adhesive 14. Another end of the conductive layer 9 is fixed on the circuit board 8 by another conductive adhesive 14.

Figure 9:
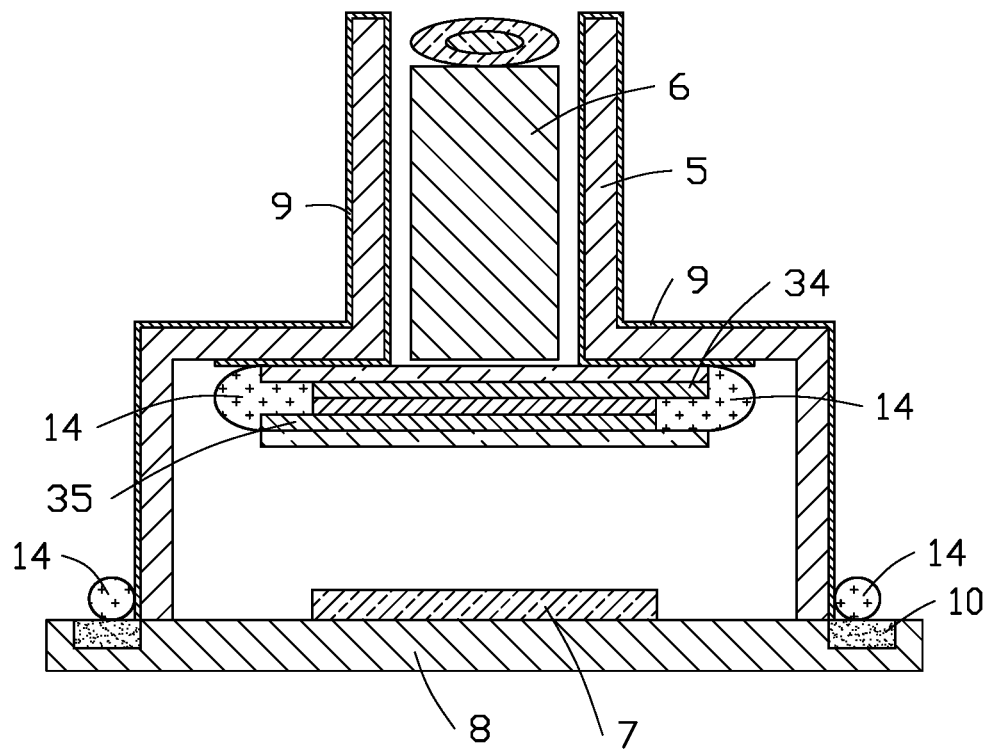
FIG. 9 is a diagrammatic view of a camera module with a conductive layer according to an embodiment of the present disclosure.
Figure 10:
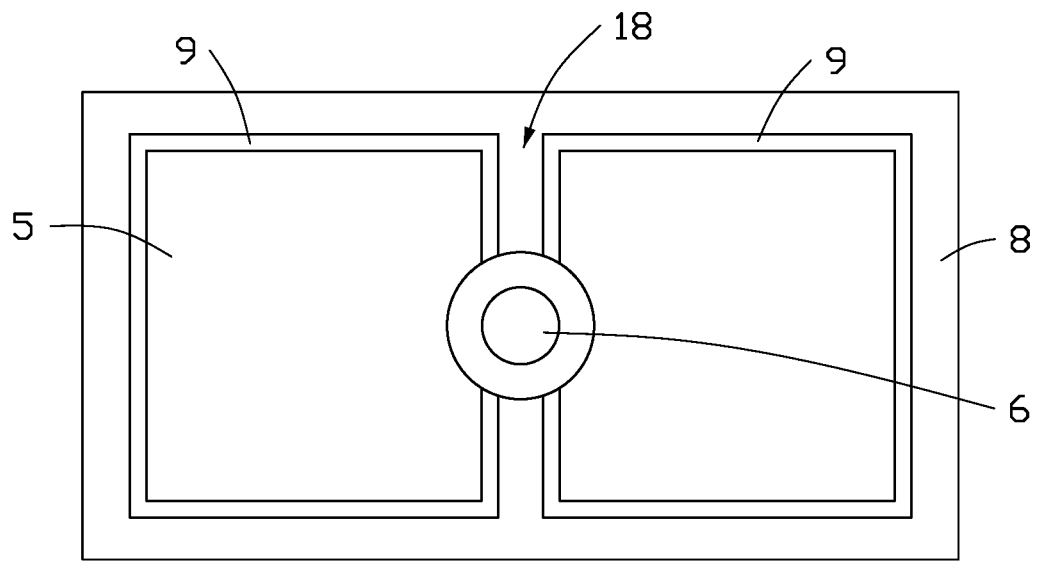
FIG. 10 is a vertical view of the camera module in FIG. 9.
Figure 11:
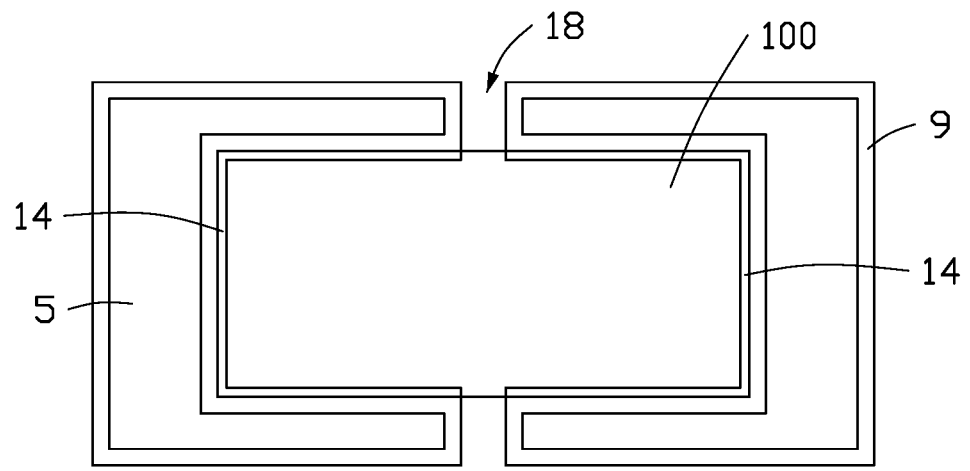
FIG. 11 is an inferior view of the camera module without a circuit board in FIG. 9.
Figure 12:
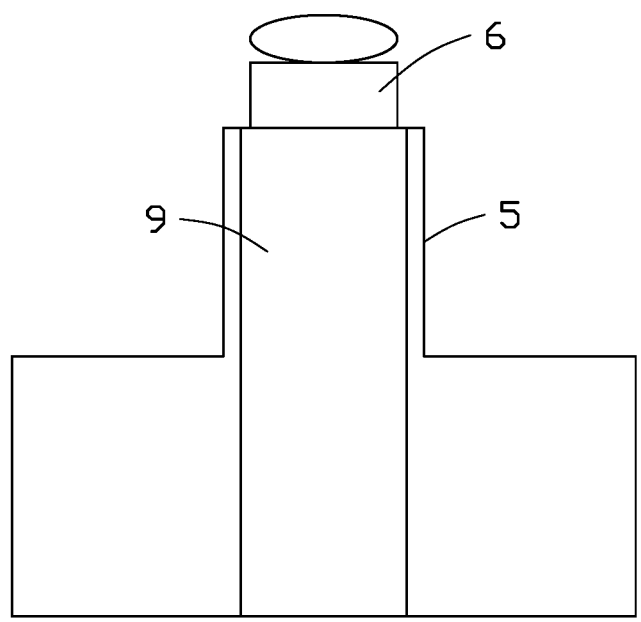
FIG. 12 is a side view of the camera module in FIG. 9.
Figure 13:
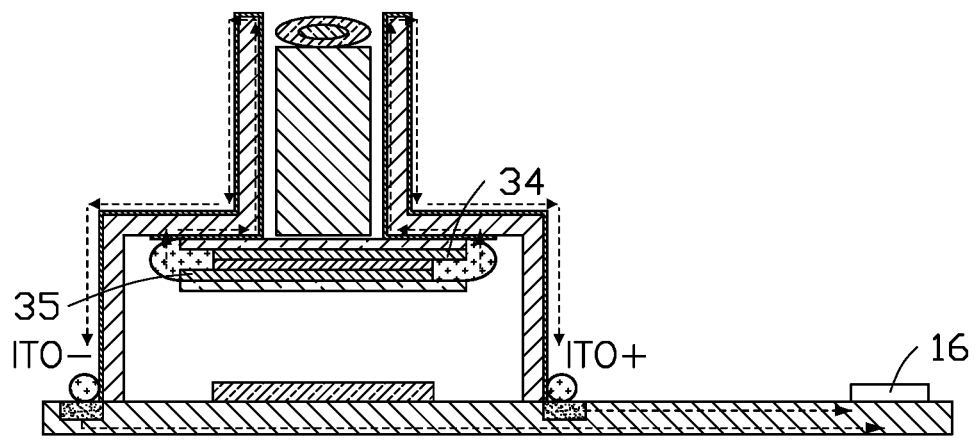
FIG. 13 is a diagrammatic view of an electric conduction path of the camera module in FIG. 9.

In one embodiment, referring to FIGS. 8-9, a window 10 is arranged on the circuit board 8. The window 10 is positioned outside the mounting bracket 5, and a circuit (not shown) of the circuit board 8 is exposed at the window 10. One end of the conductive layer 9 is connected to the first electrode area 34 or the second electrode area 35, the other end of the conductive layer 9 is connected to the circuit exposed at the window 10. In this way, the circuit board 8 can control different electrochromic units 3 to realize the modulation of different lights with different wavelengths.

In one embodiment, referring to FIGS. 9-13, only one electrochromic unit 3 is in the electrochromic module 100. The first electrode area 34 and the second electrode area 35 of the electrochromic unit 3 are through two conductive layers 9 on the surface of the mounting bracket 5 leading out to connect to the circuit board 8, respectively. The conductive layers 9 are fixed on the circuit board 8 by two conductive adhesives 14, result to a connection of the circuit exposed at the window 10 and the conductive layer 9. A controller 16 on the circuit board 8 is used to control the electrochromic unit 3.

Figure 14:
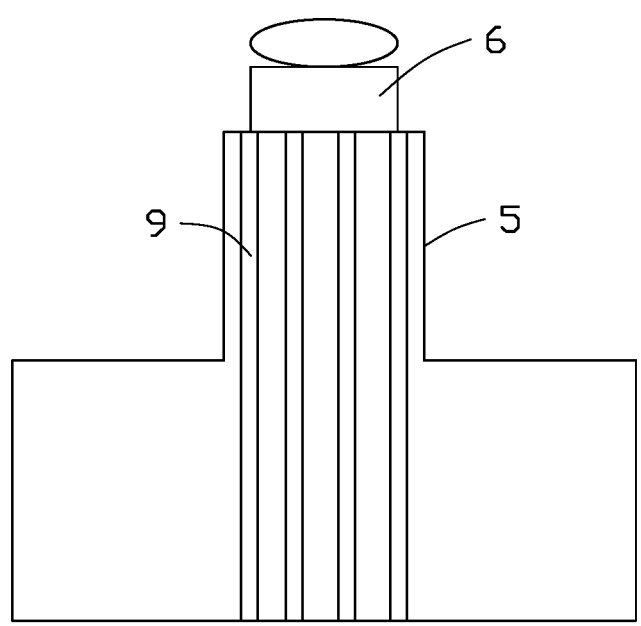
FIG. 14 is a side view of a camera module according to another embodiment of the present disclosure.

In another embodiment, referring to FIG. 8 and FIG. 14, in order to achieve multi-color adjustable, a plurality of electrochromic units 3 is in the electrochromic module 100. Each electrochromic unit 3 has two conductive layers 9. Large numbers of the conductive layers 9 are designed on the surface of the mounting bracket 5 by circuit layout. The conductive layers 9 are formed on the surface of the mounting bracket 5 by LDS. Two adjacent conductive layers 9 are controlled to keep a certain distance to avoid overlap with each other.

Referring to FIGS. 15-18, a method for assembling the camera module 200 with the conductive layer 9 includes followings steps.

Figure 15:
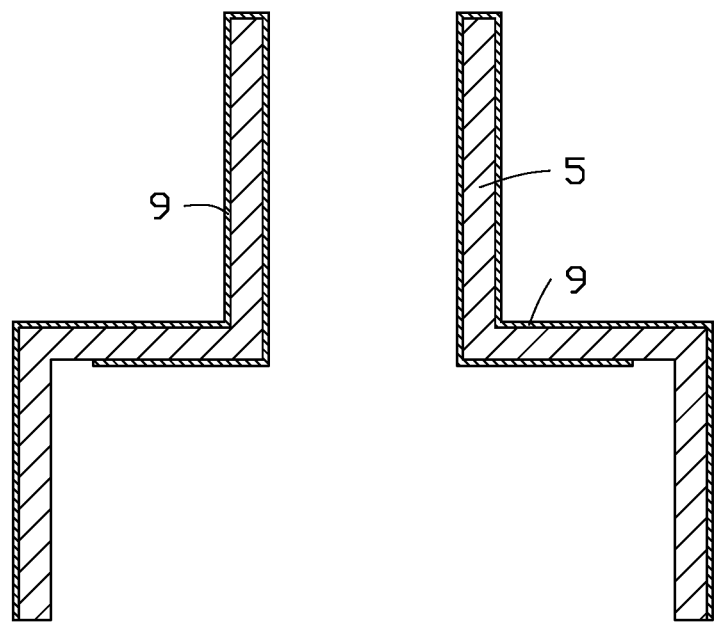
FIG. 15 to FIG. 18 are diagrammatic views showing steps of an assembling process of the camera modules in FIG. 9 or FIG. 14.

At step one, referring to FIG. 15, conductive layers 9 are formed on the surface of the mounting bracket 5 by laser direct structuring (LDS).

Figure 16:
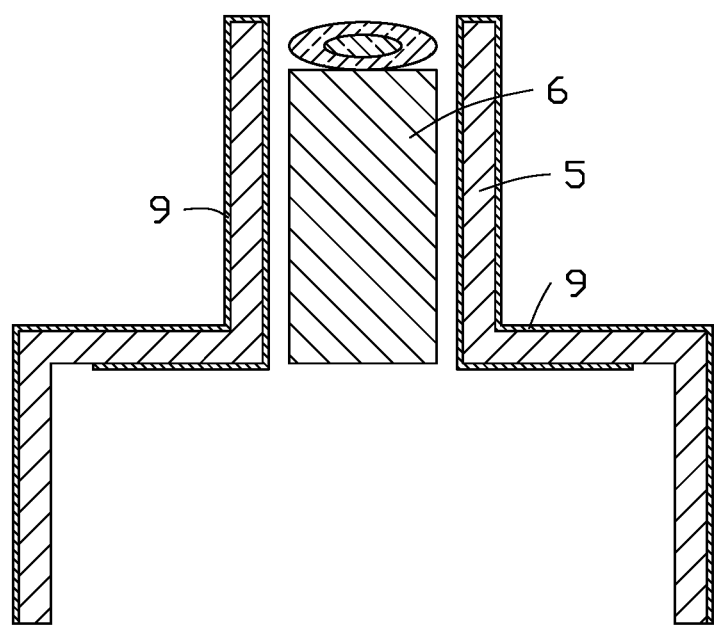

At step two, referring to FIG. 16, the lens unit 6 is disposed in the first cavity 53.

Figure 17:
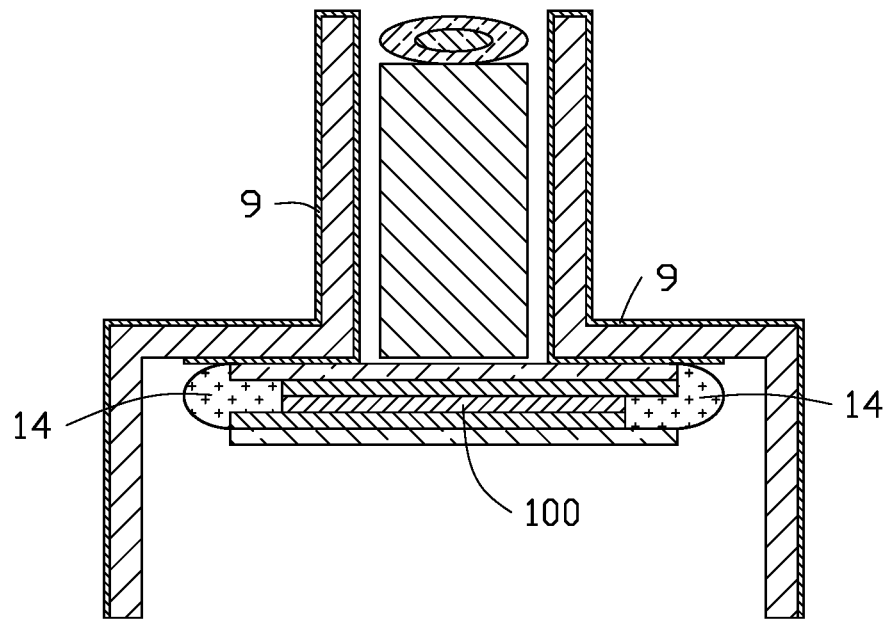

At step three, referring to FIG. 17, the mounting bracket 5 with the lens unit 6 is inverted. An opening of the second cavity 54 is upwards. The electrochromic module 100 is disposed on the fixing surface 55 and received in the second cavity 54.

At step four, referring to FIG. 17, the conductive layers 9 are fixed on the first electrode area 34 and the second electrode area 35 by conductive adhesives 14.

Figure 18:
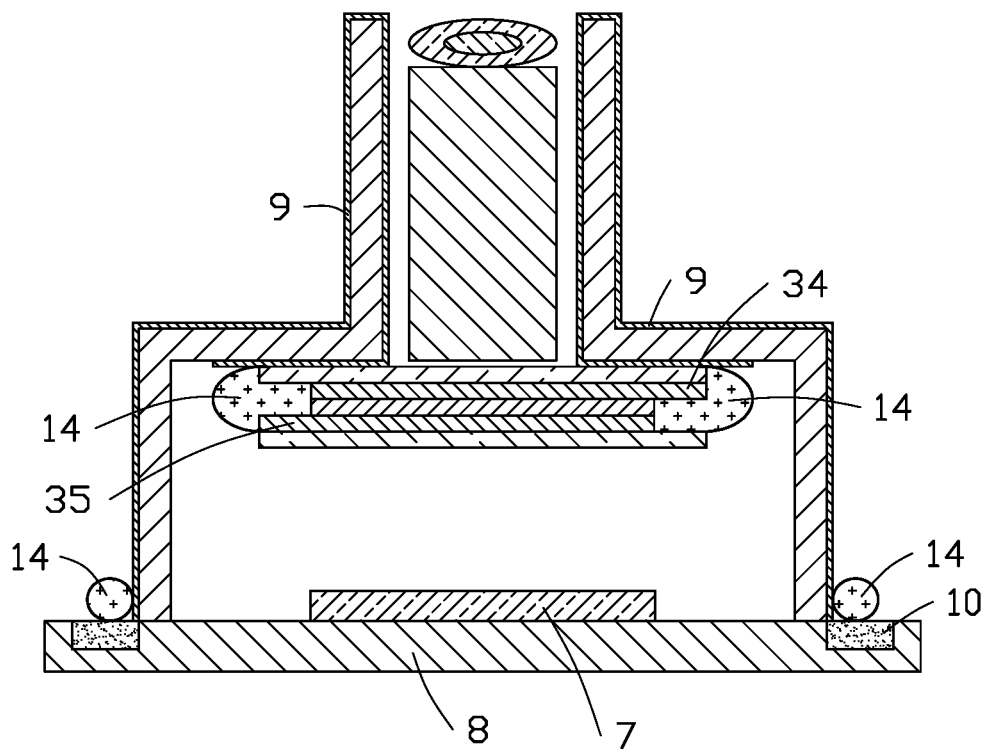

At step five, referring to FIG. 18, the windows 10 are arranged on the circuit board 8. The image sensor 7 is mounted on the circuit board 8. The circuit board 8 is bonded to the opening end of the second cavity 54. The windows 10 are positioned outside the mounting bracket 5. Each conductive layer 9 corresponds to one window 10.

At step six, referring to FIG. 18, the conductive adhesives 14 are disposed in the window 10 to make a connection between the conductive layer 9 and the circuit board 8.

The method above is suitable for the electrochromic module 100 with one electrochromic unit 3 or a plurality of electrochromic units 3.

Referring to FIGS. 19-23, the first electrode areas 34 and the second electrode areas 35 of the electrochromic module 100 are led out from the mounting bracket 5 to connect to the circuit board 8 by a flexible printed circuit (FPC) board 11. The FPC 11 includes FPC circuits 12, which can connect the electrochromic unit 3 and the circuit board 8. The FPC 11 is mounted on the second sidewall 52 of the mounting bracket 5 and received in the mounting bracket 5. An export 13 is arranged on the second sidewall 52. The export 13 is above the window 10. One end of the FPC 11 is connected to the first electrode areas 34 or the second electrode areas 35, the other end of the FPC 11 is connected to circuit board 8 extends through the export 13. The two ends of the FPC 11 are connected to the electrochromic unit 3 and the circuit board 8 by two conductive adhesives 14, respectively.

According to different numbers of the electrochromic units 3 in the camera module 200, the FPC boards 11 are different.

Figure 19:
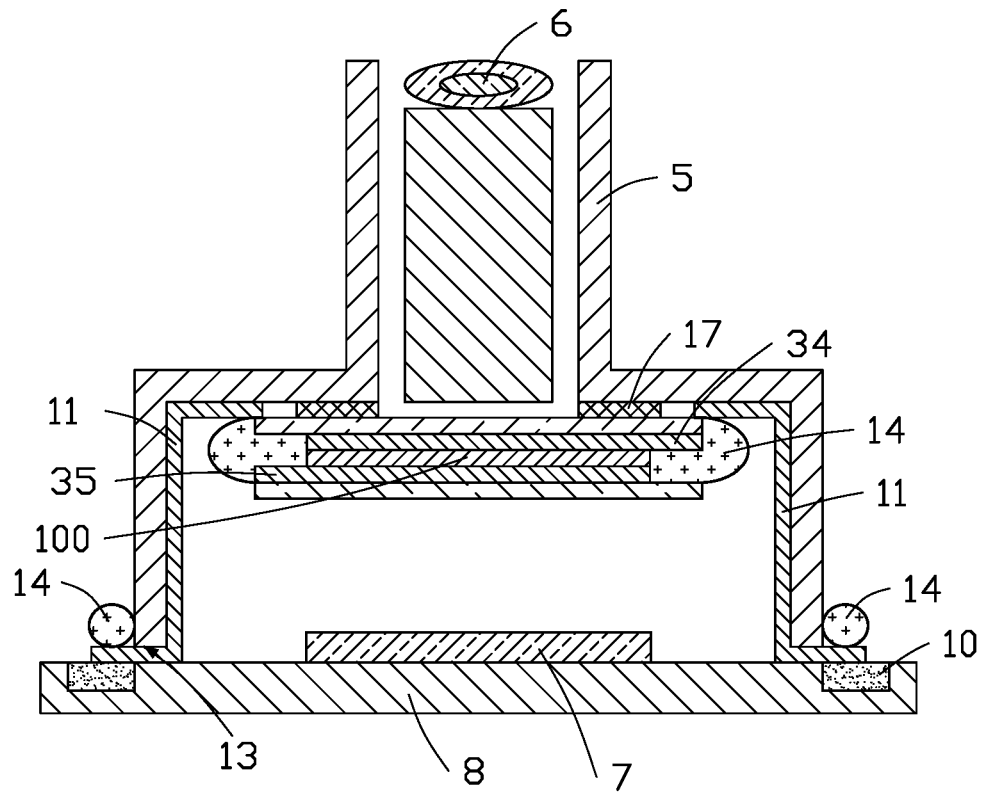
FIG. 19 is a diagrammatic view of a camera module according to a third embodiment of the present disclosure.
Figure 20:
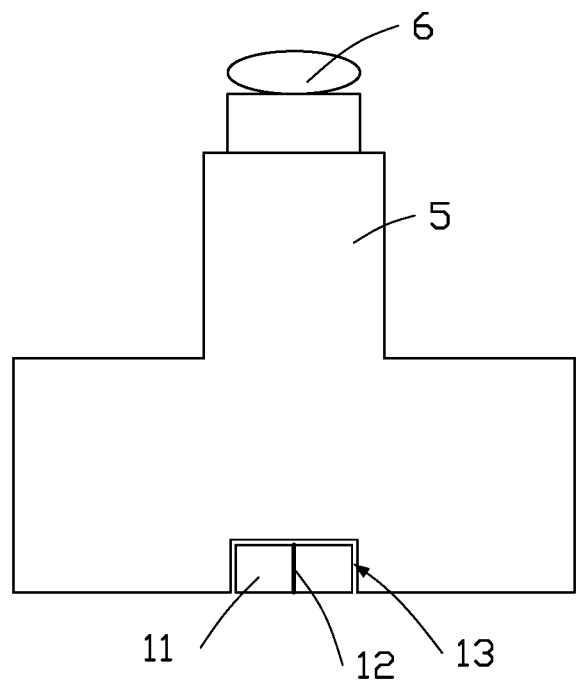
FIG. 20 is a vertical view of the camera module in FIG. 19.
Figure 23:
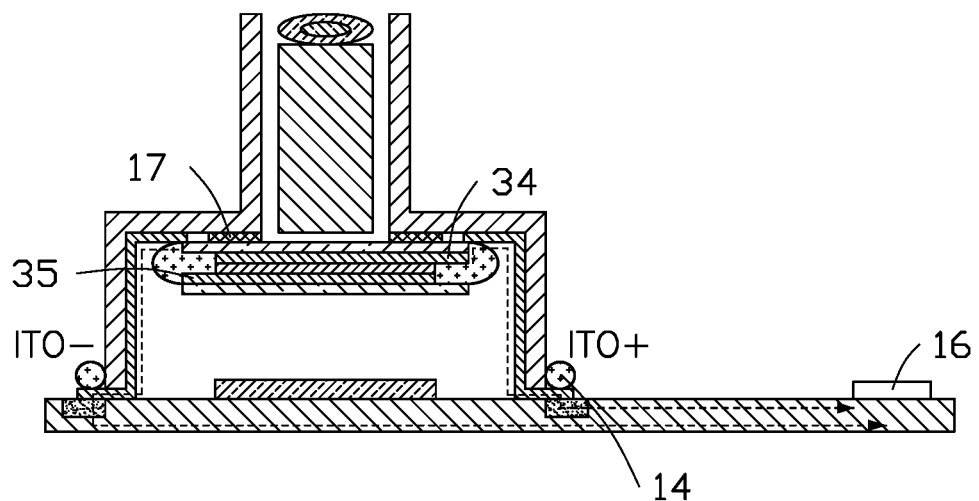
FIG. 23 is a diagrammatic view of an electric conduction path of the camera module in FIG. 19 or in FIG. 21.

In a third embodiment, referring to FIG. 19, FIG. 20, and FIG. 23, when there is only one electrochromic unit 3 in the camera module 200, the number of the FPC boards 11 are two. Each of the FPC 11 includes one FPC circuit 12. Two of the FPC boards 11 are used to make the first electrode area 34 and the second electrode area 35 connect with the circuit board 8, respectively.

Figure 21:
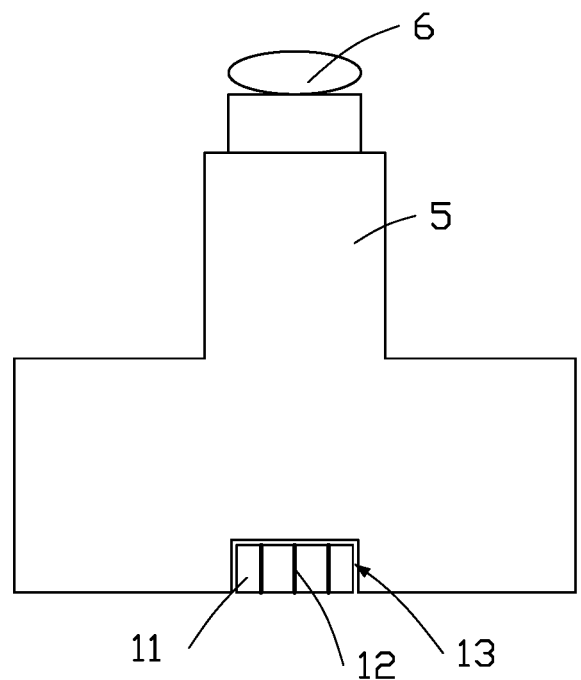
FIG. 21 is a vertical view of a camera module according to a fourth embodiment of the present disclosure.
Figure 22:
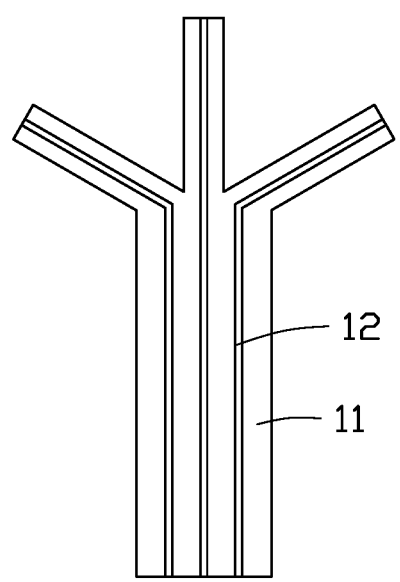
FIG. 22 is a diagrammatic view of a FPC in the camera module in FIG. 21.

In a fourth embodiment, referring to FIG. 21 and FIG. 23, when there are at least two electrochromic units 3 in the camera module 200, the number of the FPC boards 11 are at least two. If the first electrode areas 34 and the second electrode areas 35 are closed to each other, they can use one FPC 11 to realize the connection with the circuit board 8. In this case, the FPC 11 includes a plurality of FPC circuits 12. One end of the FPC 11 with a plurality of FPC circuits 12 closes to the electrochromic unit 3 is divided into a plurality of parts. Each part of the FPC 11 includes a FPC circuit 12 which will connect to the first electrode areas 34 or the second electrode areas 35. The other end of the FPC 11 with a plurality of FPC circuits 12 extends through the export 13 on the second sidewall 52 to connect to the circuit board 8. If the first electrode areas 34 and the second electrode areas 35 are far away from each other, each of them can use independent FPC 11 to realize the connection with the circuit board 8. Where the FPC circuit 12 needs to be led out and where the FPC 11 needs to be set, it is not necessary to set all the second sidewall 52 with FPC 11. It is more flexible and convenient for line layout to realize the connection of the first electrode areas 34 and the second electrode areas 35 with the circuit board 8 in this way.

Referring to FIGS. 24-27, a method for assembling the camera module 200 with the FPC 11 includes followings steps.

Figure 24:
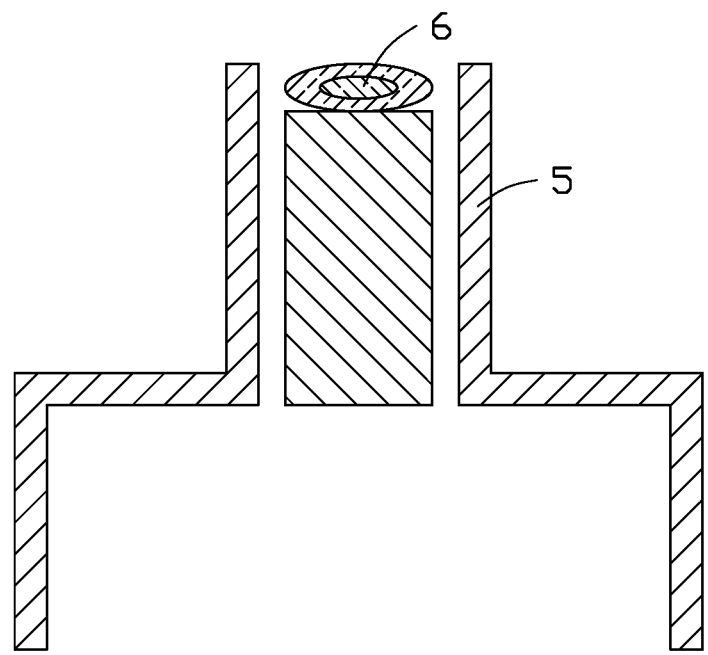
FIG. 24 to FIG. 27 are diagrammatic views showing steps of an assembling process of the camera modules in FIG. 19 or FIG. 21.

At step 1, referring to FIG. 24, FPC circuit 12 is formed on the FPC 11.

Figure 25:
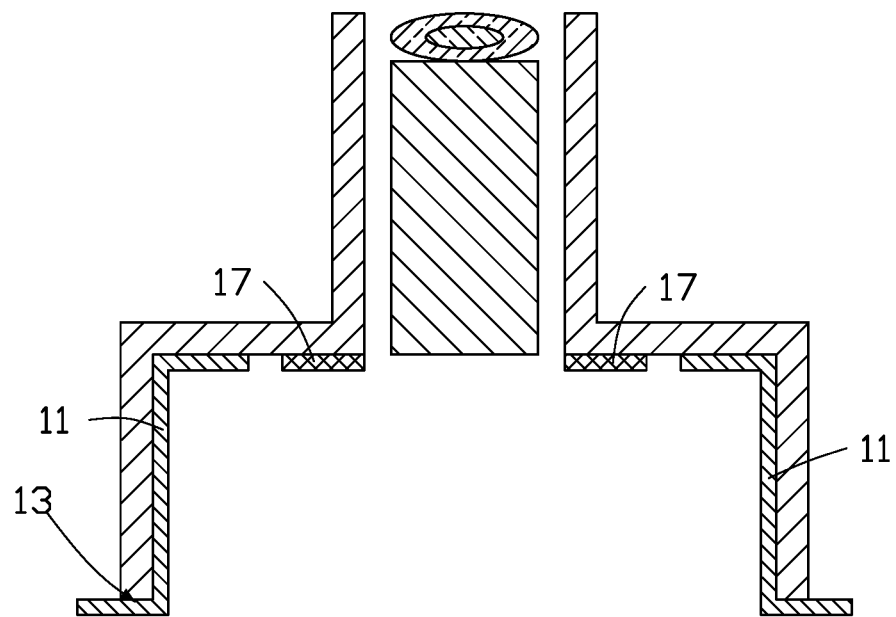

At step 2, referring to FIG. 25, the export 13 is formed on the mounting bracket 5. The number of the export 13 is same with the number of the FPC 11. The FPC 11 is mounted on the second sidewall 52.

Figure 26:
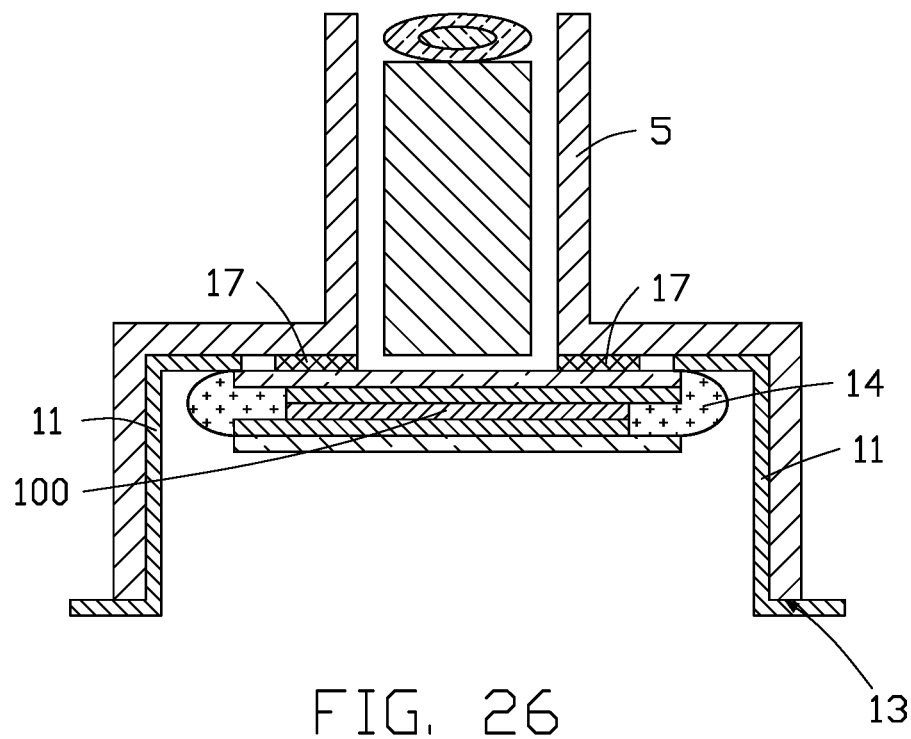

At step 3, referring to FIG. 26, the lens unit 6 is disposed in the first cavity 53. The mounting bracket 5 with the lens unit 6 is inverted. An opening of the second cavity 54 is upwards. The electrochromic module 100 is disposed on the fixing surface 55 by thermosetting adhesive 17 and received in the second cavity 54. One end of each FPC 11 is fixed on the first electrode area 34 or the second electrode area 35 by conductive adhesives 14. The other end of each FPC 11 is extends through the export 13.

Figure 27:
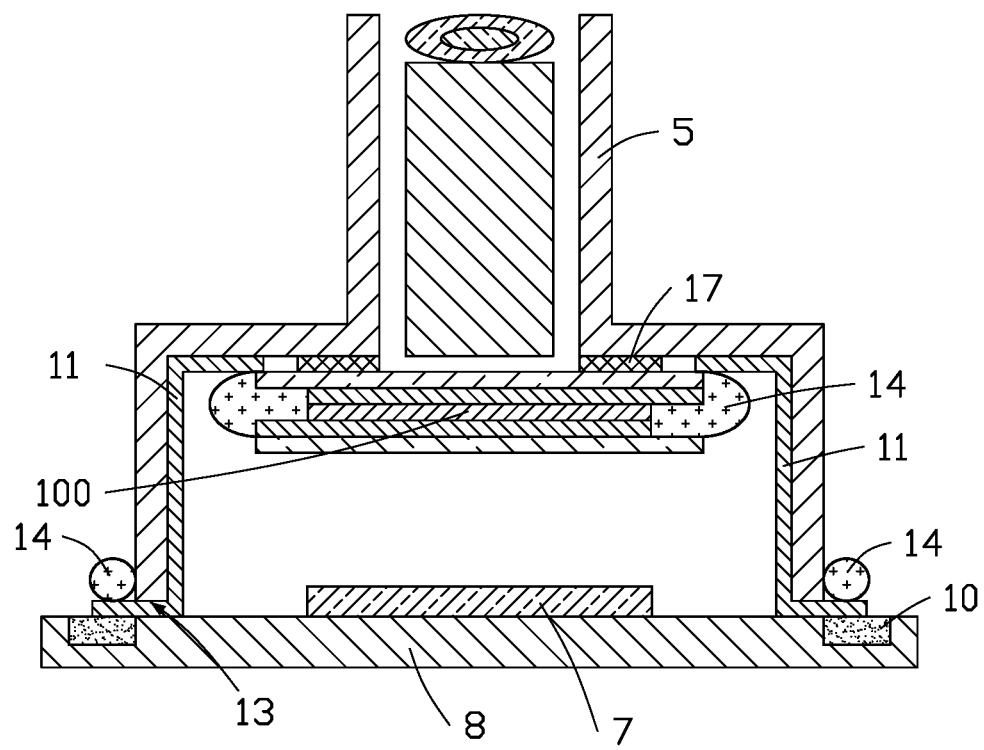

At step 4, referring to FIG. 27, the windows 10 are arranged on the circuit board 8. The image sensor 7 is mounted on the circuit board 8. The circuit board 8 is bonded to the opening end of the second cavity 54. The windows 10 are positioned outside the mounting bracket 5. Each FPC 11 corresponds to one window 10.

At step 5, referring to FIG. 27, the conductive adhesives 14 are disposed in the window 10 to make a connection between the FPC 11 and the circuit board 8.

The method above is suitable for the electrochromic module 100 with one electrochromic unit 3 or a plurality of electrochromic units 3.

The camera module 200 can not only realize the modulation of different lights with different wavelengths, but also add a layer of security measures for an electronic device.

Figure 28:
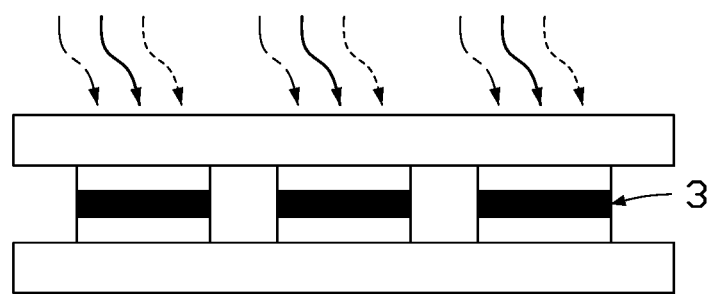
FIG. 28 is a diagrammatic view of a light path of a camera module according to an embodiment of the present disclosure.

Referring to FIG. 28, a full screen camera can be designed with the electrochromic module 100. It will be directly lit after the traditional camera is instructed. However, if the camera program is hacked or other objects act improperly, the traditional camera will be opened directly, and there is no protection measure. The camera module 200 provided above can design a camera with full screen occlusion. Through setting the electrochromic unit 3, the electrochromic unit 3 is in the black screen state after the camera module 200 is powered on, which is required an additional power to light the screen of the electrochromic unit 3. Therefore, the camera module 200 has a layer of protection measure, which may improve the security level of electronic device.

Figure 29:
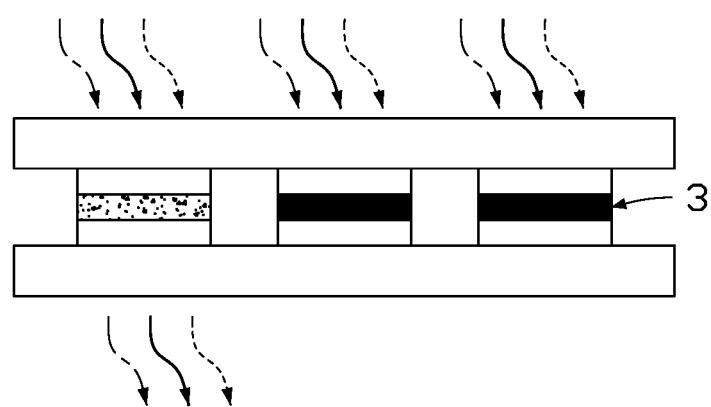
FIG. 29 is a diagrammatic view of another light path of a camera module according to an embodiment of the present disclosure.

Referring to FIG. 29, a partial occlusion screen camera can be designed with the electrochromic module 100. If there is a partial image area that you don't want to be seen by the other, the electrochromic module 100 the in the camera module 200 can realize it. At the beginning, the camera module 200 is completely black, and the image can be seen only when the filter layer 32 becomes transparent through additional power. The filter layer 32 in the electrochromic unit 3 at different positions can be designed with power on or power off, so as to achieve the purpose of camera module 200 with partial clarity and partial occlusion.

In summary, the camera module 200 has following advantages.

1. The electrochromic module 100 in the camera module 200 make it possible to realize the modulation of different lights with different wavelengths, which may avoid the mutual interferences among different lights with different wavelengths.
2. The conductive layer 9 or the FPC 11 make it easy to connect the first electrode areas 34 or the second electrode areas 35 to the circuit board 8. The whole structure of the camera module 200 is simple and easy to assemble.
3. Multiple groups of electrochromic units 3 are combined in the form of array or stack in the electrochromic module 100. By cooperating with different electrolytes, a variety of colors can be adjusted to improve the image quality and applications of the camera module 200.

Figure 30:
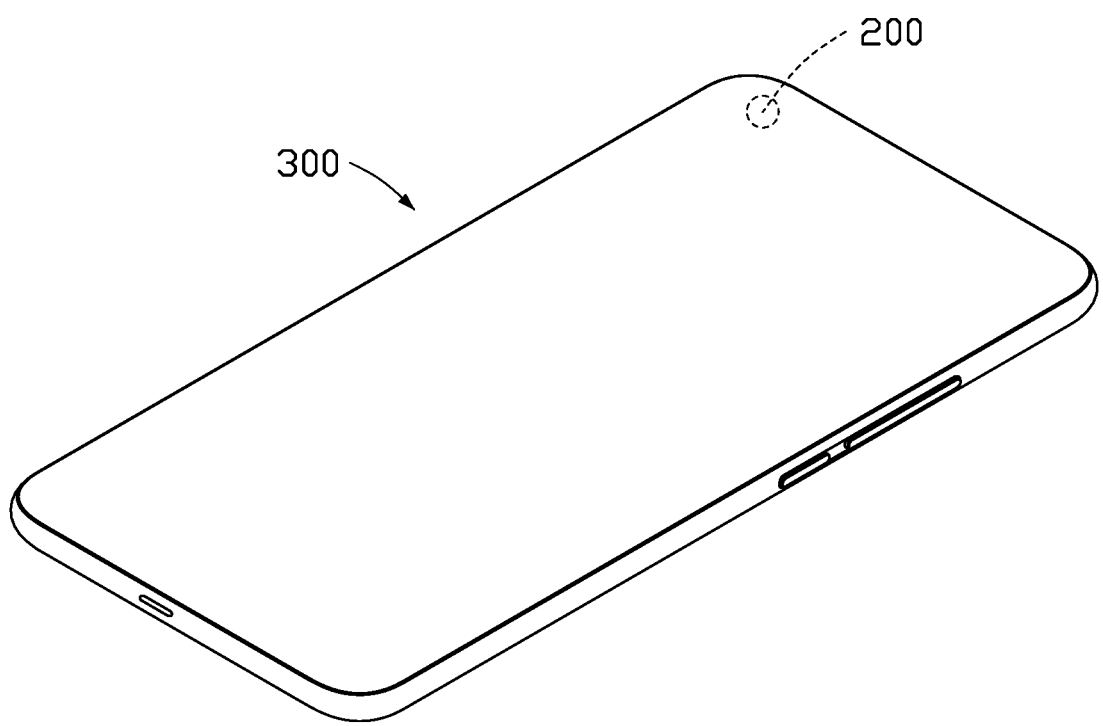
FIG. 30 is a diagrammatic of an electronic device according to an embodiment of the present disclosure.

FIG. 30 illustrates an embodiment of an electronic device 300 including the camera module 200. FIG. 30 shows that the electronic device 300 is a smart phone. In other embodiments, the electronic device 300 can also be a security monitor, tablet personal computer, and so on.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A camera module, comprising:
   a circuit board;
   a mounting bracket disposed on the circuit board;
   a lens unit disposed on the mounting bracket;
   an image sensor disposed on the circuit board and received in the mounting bracket; and
   an electrochromic module located between the image sensor and the lens unit, the electrochromic module comprising:
   two first substrates; and
   multiple electrochromic units disposed between the two first substrates,
   wherein, multiple electrochromic units comprises multiple first electrode areas and multiple second electrode areas, each of the multiple electrochromic units comprises a first conductive layer, a filter layer, and a second conductive layer stacked in that order, one end of the first conductive layer protrudes from the filter layer to form one of the multiple first electrode areas, one end of the second conductive layer protrudes from the filter layer to form one of the multiple second electrode area, vertical projections of the first electrode area and the second electrode area on the first substrates are spaced apart from each other, each of the first electrode area and the second electrode area is configured to connect to the circuit board;
   the electrochromic module further comprising a flexible printed circuit (FPC) configured to connect the multiple first electrode areas and the multiple second electrode areas to the circuit board,
   wherein the FPC is mounted on an interior surface of the mounting bracket, the mounting bracket comprises an export corresponding to the FPC board, one end of the FPC away from the electrochromic module extends through the export to connect to the circuit board; wherein an end of the FPC mounted on the interior surface of the mounting bracket is divided into multiple separate FPC circuits, the multiple separate FPC circuits are electrically connected to the multiple first electrode areas and the multiple second electrode areas, ends of the multiple separate FPC circuits close to the export connect together to form an integrated structure, and the integrated structure extends through the export to connect to the circuit board.

2. The camera module of claim 1, wherein the electrochromic module is mounted in the mounting bracket by a thermosetting adhesive.

3. The camera module of claim 2, wherein one end of the FPC is mounted on the first electrode area or the second electrode area by a conductive adhesive, another end of the FPC is mounted on the circuit board by another conductive adhesive.

4. The camera module of claim 1, wherein the circuit board defines a window, and the window is disposed outside the mounting bracket.

5. The camera module of claim 1, wherein the mounting bracket comprises a plurality of first sidewalls and a plurality of second sidewalls each connected to a corresponding one of the plurality of first sidewalls, the plurality of first sidewalls cooperatively defines a first cavity, the plurality of second sidewalls cooperatively defines a second cavity, an internal dimension of the second cavity is greater than an internal dimension of the first cavity, a fixing surface is formed between the plurality of first sidewalls and the plurality of second sidewalls, the lens unit is disposed in the first cavity, one end of the plurality of second sidewall away from the plurality of first sidewalls is disposed on the circuit board, the electrochromic module is disposed on the fixing surface and received in the second cavity.

6. The camera module of claim 2, wherein the mounting bracket comprises a plurality of first sidewalls and a plurality of second sidewalls each connected to a corresponding one of the plurality of first sidewalls, the plurality of first sidewalls cooperatively defines a first cavity, the plurality of second sidewalls cooperatively defines a second cavity, an internal dimension of the second cavity is greater than an internal dimension of the first cavity, a fixing surface is formed between the plurality of first sidewalls and the plurality of second sidewalls, the lens unit is disposed in the first cavity, one end of the plurality of second sidewall away from the plurality of first sidewalls is disposed on the circuit board, the electrochromic module is disposed on the fixing surface and received in the second cavity.

7. An electronic device, comprising:
a camera module, the camera module comprising:
a circuit board;
a mounting bracket disposed on the circuit board;
a lens unit disposed on the mounting bracket;
an image sensor disposed on the circuit board and received in the mounting bracket; and
an electrochromic module located between the image sensor and the lens unit, the electrochromic module comprising:
two first substrates; and
multiple electrochromic units disposed between the two first substrates,
wherein, multiple electrochromic units comprises multiple first electrode areas and multiple second electrode areas, each of the multiple electrochromic units comprises a first conductive layer, a filter layer, and a second conductive layer stacked in that order, one end of the first conductive layer protrudes from the filter layer to form one of the multiple first electrode areas, one end of the second conductive layer protrudes from the filter layer to form one of the multiple second electrode areas, vertical projections of the first electrode area and the second electrode area on the first substrates are spaced apart from each other, each of the first electrode area and the second electrode area is configured to connect to the circuit board;
the electrochromic module further comprising a flexible printed circuit (FPC) configured to connect the multiple first electrode areas and the multiple second electrode areas to the circuit board,
wherein the FPC is mounted on an interior surface of the mounting bracket, the mounting bracket comprises an export corresponding to the FPC board, one end of the FPC away from the electrochromic module extends through the export to connect to the circuit board; wherein an end of the FPC mounted on the interior surface of the mounting bracket is divided into multiple separate FPC circuits, the multiple separate FPC circuits are electrically connected to the multiple first electrode areas and the multiple second electrode areas, ends of the multiple separate FPC circuits close to the export connect together to form an integrated structure, and the integrated structure extends through the export to connect to the circuit board.

8. The electronic device of claim 7,
the electrochromic module is mounted in the mounting bracket by a thermosetting adhesive, one end of the FPC is mounted on the first electrode area or the second electrode area by a conductive adhesive, another end of the FPC is mounted on the circuit board by another conductive adhesive.

9. The electronic device of claim 8, wherein the circuit board defines a window, and the window is disposed outside the mounting bracket.

* * * * *